United States Patent [19]

Ringdal

[11] 3,897,527

[45] July 29, 1975

[54] METHOD OF MANUFACTURING ARTICLES FROM HOT SOLID FILLER MATERIAL COATED WITH THERMOPLASTIC MATERIAL

[76] Inventor: Lars Ringdal, Montebelloveien 15, Oslo 3, Norway

[22] Filed: Mar. 28, 1972

[21] Appl. No.: 238,910

Related U.S. Application Data

[63] Continuation-in-part of Ser. No. 20,622, March 18, 1970, abandoned.

[52] U.S. Cl. .................. 264/37; 264/122; 264/126
[51] Int. Cl.² .......................................... B29B 3/02
[58] Field of Search....................... 264/126, 122, 37

[56] References Cited
UNITED STATES PATENTS

| | | | |
|---|---|---|---|
| 3,398,012 | 8/1968 | Parkes et al. | 117/100 |
| 3,436,243 | 4/1969 | Kruger | 117/100 |
| 3,443,492 | 5/1969 | Pleass | 117/100 |
| 3,714,312 | 1/1973 | Nitta | 264/310 |

*Primary Examiner*—Robert F. White
*Assistant Examiner*—J. R. Hall
*Attorney, Agent, or Firm*—Pennie & Edmonds

[57] ABSTRACT

A method of manufacturing articles such as a pipe section from particles of solid granular filler material and thermoplastic material is disclosed in which the particles of solid granular material are first heated to a temperature in excess of that required to melt the thermoplastic material and are then mixed with the thermoplastic material which is provided in the form of a powder. The thermoplastic material is melted and coats the solid granular material, the heat being supplied by the stored heat of the granular material itself. The coated granular material, still retaining considerable heat, is immediately then supplied to a suitable mold in which the coated particles adhere to each other to form the ultimate molded product bound together by the thermoplastic material.

8 Claims, 1 Drawing Figure

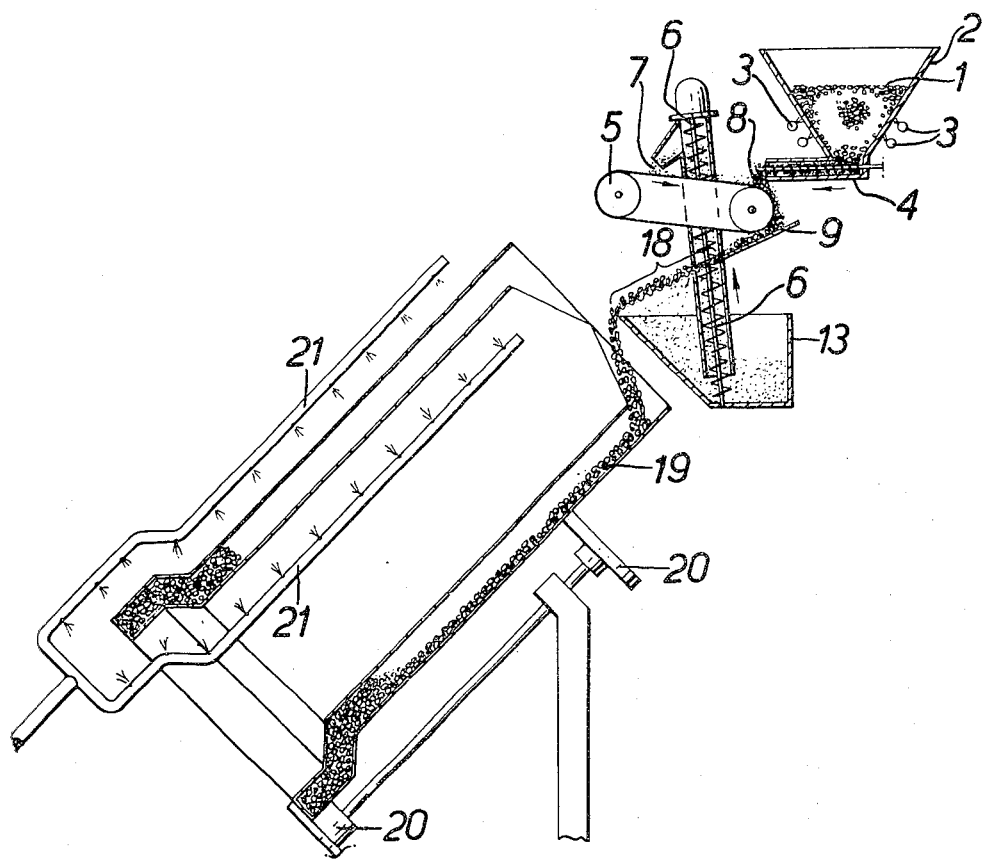

METHOD OF MANUFACTURING ARTICLES FROM HOT SOLID FILLER MATERIAL COATED WITH THERMOPLASTIC MATERIAL

CROSS-REFERENCE TO RELATED APPLICATION

This application is a continuation-in-part of the U.S. patent application of the applicant Lars Ringdal, filed Mar. 18, 1970, Ser. No. 20,622 now abandoned.

BRIEF SUMMARY OF THE INVENTION

The present invention relates to a method of manufacturing articles, for example, plates, blocks or pipe sections, from non-thermoplastic granular filler materials coated in a special manner with thermoplastic material.

A number of proposals have been made for coating particles of granular material with synthetic plastics. One such proposal is the manufacture of free-flowing particles each comprising a grain of sand or gravel coated with a plastic material and used as a synthetic ski surface. It has also been proposed to coat the individual particles of sand with a resin to produce a bulk, free-flowing, coated sand product which is bagged for later use as a foundry material. In one instance it was proposed to heat the gravel in an agitated fluid bed, but that type of heating does not preclude the retention or delay of some particles in the heating apparatus or provide for uniform heating.

It has been discovered through experimentation that the usual heating of granular materials to be coated with thermoplastics have not been carried out with reasonable heat economy. Furthermore, it has been found extremely difficult to reheat coated particles and use them efficiently to manufacture articles. It will readily be understood that particles already coated with thermoplastic material cannot readily absorb heat or be uniformly heated because of the plastic coating.

The primary object of the present invention is, therefore, to provide a continuous operation in which the plastic-coated solid particles of gravel and the like are utilized as soon as coated and while hot to form the desired article in a mold cavity. In this connection it has been discovered that a satisfactory series of steps may be carried out provided the particles of solid granular material are heated to such a temperature that sufficient heat is accumulated at a sufficiently high temperature not only to melt plastic powder to coat the solid particles, but also sufficient to maintain the plastic coating in such a state that the particles stick to each other when they are transferred into a mold cavity.

Accordingly, the present invention constitutes an improvement in method of manufacturing articles from particles of solid granular filler materials, such as gravel, expanded clay balls and the like, and thermoplastic materials, in which the particles of solid granular materials are coated with the thermoplastic materials. More particularly, the improved method comprises the steps of conducting particles of a solid granular material adapted to store heat through a heating zone and therein heating the solid particles to be coated to a temperature substantially in excess of that required to melt the thermoplastic material in quantity sufficient to coat the solid particles and to store heat in the solid particles, conducting the resulting hot solid particles into a mixing zone, supplying powdered thermoplastic material to the mixing zone in a proportion sufficient to coat the hot solid particles therein, thoroughly mingling the hot solid particles with said proportion of powdered thermoplastic material and melting thermoplastic material on the surfaces of the solid particles, passing the resulting plastic-coated solid particles while hot directly and continuously into a mold having the shape of the article to be produced, and continuously introducing the hot coated solid particles of granular material into the mold until it is filled, the hot plastic-coated solid particles as delivered into the mold being at such a temperature and containing such an amount of heat as a result of the heating in the heating zone as to maintain the plastic coating at a temperature such that the particles of plastic-coated solid particles stick to each other in the mold.

The present invention preferably includes other features such as the use of expanded clay balls in addition to gravel and other refractory solid materials which remain substantially unaffected when they are heated to temperatures up to twice the centigrade temperature required to melt the thermoplastic material, for example, 300° C. for a thermoplastic material having a melting point of about 150° C. The process also preferably includes the utilization of excess powdered thermoplastic material in the mixing zone so that the solid particles are thoroughly coated with melted plastic. This step is carried out in the mixing zone, and a separating zone is employed for separating the coated solid particles from the excess of thermoplastic material which is recycled to the mixing zone as the operations proceed continuously.

Other features of the invention are described in connection with the drawing accompanying this application.

BRIEF DESCRIPTION OF THE DRAWING

The single FIGURE shown in the drawing is a diagrammatic view partly in section of an apparatus for carrying out the improved method for the direct production of a pipe section.

DETAILED DESCRIPTION OF THE PREFERRED EMBODIMENT

The drawing shows an apparatus in which the improved method is used in the production of a drain pipe. On the drawing the filler material 1 is contained in a hopper 2. The filler may, for example, be gravel or expanded clay ball-type particles of an average grain size of 7–8 mm. The filler is heated to a desired temperature by means of burners 3 or other heating elements arranged outside the hopper 2, and in hot state the filler material is fed to one end of a conveyor 5 by means of a screw conveyor 4. The conveyor 5 is also supplied with finely ground plastic material 7 by means of a screw conveyor 6, and the thermoplastic material meets the hot filler material 1 on the conveyor 5 at the point 8. The thermoplastic material and the filler leave the conveyor 5 and fall onto a plate 9 on which the thermoplastic powder and the hot particles of filler material roll and move about each other so that the hot particles of the filler material melt the plastic and are completely coated.

The plate 9 provides a mixing zone and is on its lower end portion provided with a perforated section 18 through which unused or excess ground plastic material falls in order to be collected in a container 13 for return to the conveyor 5 by the elevator conveyor 6. The hot plastic-coated particles of the filler material leaving the plate 9 are transferred directly while hot to a mold 19, which in the example shown in the drawing, is adapted for the manufacture of pipe sections, for example for drainage or sewage lines. The mold 19 is rotatably supported on rollers 20, and during rotation the hot plastic-coated solid particles are evenly distributed in the mold cavity. The mold and the material therein may be maintained at a predetermined temperature by means of a burner 21 having flames directed respectively against the inner and outer walls of the mold 19, until the mold is filled.

The temperature to which the filler particles are heated in the hopper 2 and that of the material delivered to the mold are so controlled that the plastic coatings on the particles permit agglomeration of the coated particles into a unitary mass with the thermoplastic coating of the particles providing the adhesion of therebetween to form the articles being made. Depending on the proportion of plastic material applied to the filler particles, for example, tube sections may be completely closed or may be impervious for conveying liquids, for example sewages, which will not corrode the chemical resistant plastic material, or the tubes and pipes may be permeable to liquids, for example water to be drained away, if the proportion of plastic material to filler particles is reduced to leave open interstices between coated particles in the wall or walls of the product.

The temperature to which the particles of filler material has to be heated will depend on various conditions, for example the thickness of the plastic coating desired on the particles, the time it takes to transfer the particles after they have been coated and also on the permissible or desired distance between the particles in the finished product. A relatively high temperature will keep the plastic coating so soft that the particles even may be brought into contact with each other in the mold.

It will be understood that as soon as the mold 19 is filled the stream of hot coated particles pouring from the section 18 may be shifted to another mold while the mold 19 is cooled. The cooling may be effected in various ways such as by using water sprays on the inner and outer surfaces of the mold, following which the inner wall member and the molded pipe section are removed. As soon as the inner wall member is reassembled in place, the mold 19 is ready to receive another charge.

The apparatus may include known means for proportioning the streams of solid particles and powdered plastic material delivered to the conveyor 5 in accordance with the thickness of the coating to be applied to the solid particles.

In order to carry out an economic operation, it is desirable that the heated solid particles delivered by the screw conveyor 4 be at a temperature which is considerably in excess of the melting point of the thermoplastic material employed. The solid particles may, for example, be at a centigrade temperature twice that of the centigrade melting point of the thermoplastic material. As an example, in using a polyethylene having a melting point of about 132° C. as the thermoplastic material, the solid particles to be delivered by the conveyor 4 should have a temperature of approximately 264° C. The solid particles are heated through to a substantially uniform temperature so that there is ample heat (BTU) to melt the thermoplastic material and film or coat it on the particles. Since temperatures of this order and higher may be employed, the gravel or other particulate solid material should be stable and not disintegrate when heated to 300° to 400° C.

In making impervious pipe sections, for example, the excess of thermoplastic material mingled with the hot solid particles in the mixing zone may be increased to the point necessary to provide a pipe section in which the interstices between solid particles are all filled with melted thermoplastic material. The proportion of thermoplastic material to that of hot solid particles delivered to the mixing zone may be such that the pipe section formed would be pervious to liquids and suitable for use in a liquid disposal field used in connection with a septic tank.

I claim:

1. The method of manufacturing articles from particles of solid granular filler material and thermoplastic material, in which the particles of solid granular material are coated with thermoplastic material, the method comprising the steps of conducting particles of solid granular material adapted to store heat through a heating zone and therein heating the solid particles to be coated to a temperature substantially in excess of that required to melt the thermoplastic material in quantities sufficient to coat the solid particles with the stored heat therein, said particles of solid granular material being stable and substantially resistant to disintegration at the temperature used, conducting the resulting solid particles into a mixing zone subsequent to said heating, supplying powdered thermoplastic material to the mixing zone in a proportion sufficient to coat said solid particles, thoroughly mingling the solid particles with said proportion of powdered thermoplastic material and melting said thermoplastic material onto the surfaces of the solid particles by utilizing the stored heat of said particles to melt said thermoplastic material and thus coat the particles, passing the resulting plastic-coated solid particles directly and continuously into a mold having a shape of the article to be produced until said mold is filled, the plastic-coated solid particles as delivered into the mold being at such a temperature and containing such an amount of stored heat as a result of the heating in the heating zone as to maintain the plastic coating at a temperature such that the particles of plastic-coated solid particles stick to each other in the mold, and cooling the particles in the mold sufficiently to permit removal of the molded article from the mold.

2. The method as claimed in claim 1, wherein the solid particles are heated in the heating zone to a centigrade temperature approximating twice that required to melt the powdered thermoplastic material sufficiently to provide a coating.

3. The method as claimed in claim 1, wherein said proportion of thermoplastic material is in excess of that necessary to coat the hot solid particles, passing the mingled hot coated solid particles and excess powdered thermoplastic into a separating zone and separating the hot coated solid particles from the excess thermoplastic material, and passing the separated hot coated solid particles directly into said mold.

4. The method as claimed in claim 1, wherein the particles of granular solid filler material are of gravel or expanded clay balls adapted to be heated to the required temperature without substantial alteration and having an average size of 7 to 8 mm.

5. The method as claimed in claim 3, including a collecting zone source for powdered thermoplastic material to be supplied to the mixing zone, and delivering the excess separated powdered thermoplastic material from the separating zone into the collecting zone.

6. The method of coating as claimed in claim 1, including the step of keeping the heated granular solid particles and powdered thermoplastic material in motion and in intimate mingled contact with each other until a coating of desired thickness is formed on said particles.

7. The method as claimed in claim 1, wherein a continuous operation is carried out in which a stream of heated solid granular particles is mingled with a stream of thermoplastic material in the mixing zone in excess of that required to coat said particles, conducting the resulting mingled materials through a separating zone in which the excess of thermoplastic material is separated from coated solid particles, and returning the separated excess of thermoplastic material to the mixing zone to be mingled with hot solid granular particles coming directly from the heating zone.

8. The method as claimed in claim 1, wherein the particles of solid granular material are stable and substantially resistant to disintegration when heated to temperatures of from 300° to 400° C.

* * * * *